Oct. 19, 1965 | L. L. TRIBBY | 3,213,433

DRIVE CIRCUIT FOR CORE MEMORY

Filed March 29, 1961

INVENTOR
LOREN L. TRIBBY

BY Louis A Klein
John J. Callahan

HIS ATTORNEYS

United States Patent Office 3,213,433
Patented Oct. 19, 1965

3,213,433
DRIVE CIRCUIT FOR CORE MEMORY

Loren L. Tribby, West Carrollton, Ohio, assignor to The National Cash Register Company, Dayton, Ohio, a corporation of Maryland Filed Mar. 29, 1961, Ser. No. 99,245
5 Claims. (Cl. 340—174)

Figure 1:
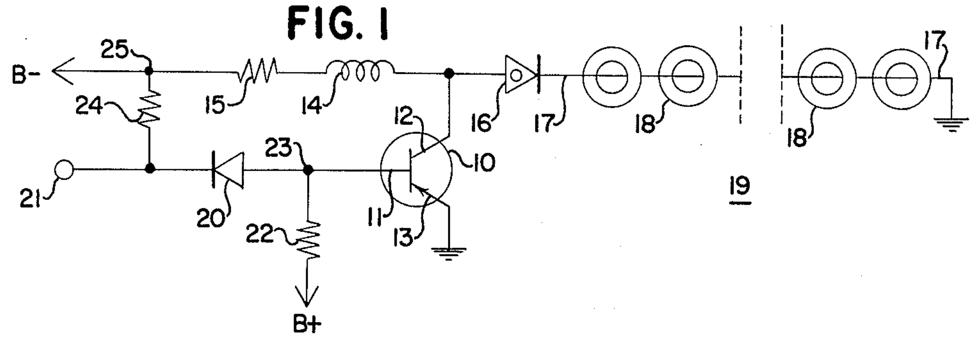

The present invention relates to memory systems utilizing a plurality of magnetic cores and is directed in particular to a circuit arrangement for driving said cores.

In arrays of magnetic cores employed for storage of binary information as represented by relative stable states attained by individual cores, it is convenient to consider them in ordered geometric form for operation in accordance with the well-known coincident current technique. With such systems, a coincidence of two input signals is generally required to provide a magnetomotive force of sufficient magnitude to overcome the coercive force of any one core, and for this purpose the memory array is arranged in rows and columns, each of which is formed by cores linked by an individual winding. By applying a pulse to one column winding and a coincident pulse to one row winding, each pulse providing a force less than the coercive force, only that core linked by both windings changes remanence state to store or register the information represented by the pair of pulses. Such an operation as that described may be employed in storing desired bits of information at particular row and column addresses. In some applications, it is desired that all the cores of the memory be interrogated simultaneously to determine the state ot which each exists. To accomplish this type of interrogation, all of the cores of the memory are provided with a series-connected interrogation or read winding which is pulsed in the opposite sense. The interrogating or read pulsing returns the cores in which a bit of information was stored during the write operation to their initial remanence state and causes a voltage to be induced in a separate sense winding linking each of these cores, due to collapse of the magnetic field in one direction and its build-up in the opposite direction. This interrogation of the cores of the memory provides output pulses indicative of the particular residual state attained by each of the cores, and the memory is cleared of information, so that the cores are reset to a datum state.

One object of the present invention is to provide a constant current driver capable of producing an output drive pulse that is not affected appreciably by the number of cores residing in a particular bistable state of magnetic remanence.

Another object of the present invention is to provide a constant current driver capable of producing an output current drive pulse having a rise and fall time which is substantially independent of the induced electromotive force (E.M.F.) developed by the cores as they are driven from one bistable state to the other.

Another object of the present invention is to provide a constant current driver which is effectively isolated from the cores when information is being stored therein.

Another object of the present invention is to provide a constant current driver having transistor switching means capable of controlling the output thereof.

A more specific object of the present invention is to provide a constant current driver capable of producing an output drive pulse suitable for resetting the cores to a desired one of their bistable states of magnetic remanence.

Other objects and advantages of the invention will become apparent from a consideration of the following specification and claims, taken together with the accompanying drawing.

Figure 2:
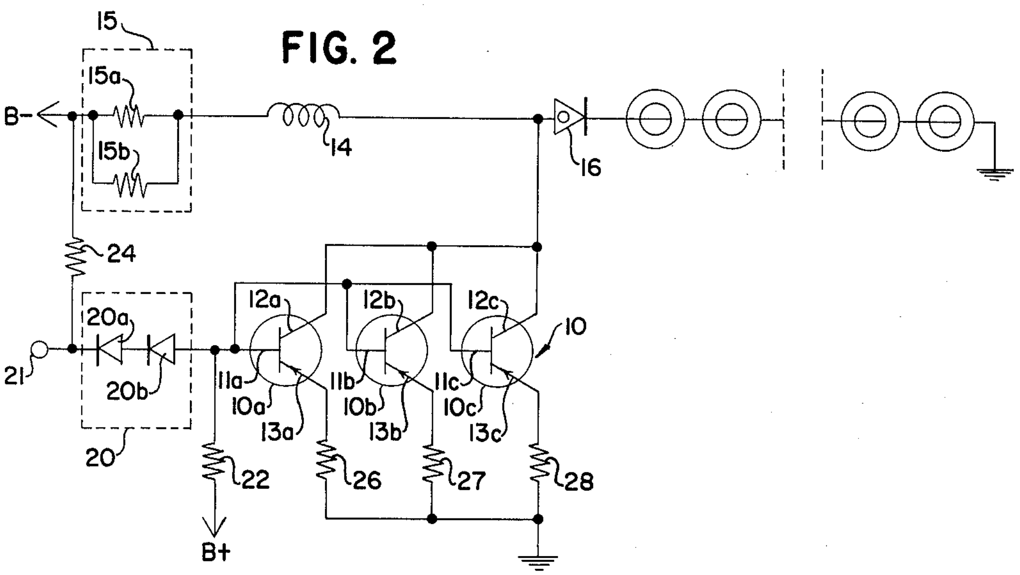

In the drawings:

FIGURE 1 is a schematic circuit diagram of a driver circuit incorporating the principles of the present invention; and FIGURE 2 is a schematic circuit diagram of a variation of the invention shown in FIGURE 1.

In its principal aspect, the present invention takes the form of a driver circuit comprising a source of power, a plurality of magnetic cores capable of assuming bistable states of magnetic remanence, a series circuit extending from the source of power through the plurality of magnetic cores, and switching means which is connected to the series circuit. The switching means is arranged to selectively direct current flow from the source of power through the magnetic cores or through the switching means itself.

In accordance with a further aspect of the present invention, the aforementioned series circuit comprises an inductor and a Zener type diode, and the switching means comprises a transistor device. The transistor device is provided with means for applying initiating trigger pulses to it, and it is connected effectively between the source of power and the series circuit. The connection to the series circuit is made at a point between the inductor and the Zener type diode of the series circuit.

Referring now to FIGURE 1 of the drawing, 10 indicates a semiconductor device of the type commonly referred to as a transistor having a base electrode 11, a collector electrode 12, and an emitter electrode 13. The emitter electrode 13 is connected to a point of reference potential as ground. The collector electrode 12 is connected through an inductor 14 and a resistor 15 to a source of power or negative biasing potential B—. The collector electrode 12 is also connected through a Zener type diode 16 to a winding 17, the other end of the winding 17 being connected to a point of reference potential as ground. The winding 17 is shown linking each of the magnetic cores 18 of the memory system indicated generally at 19. The base electrode 11 is connected through a diode 20 to an input terminal 21. The input terminal 21 comprises means for applying initiating trigger pulses to the driver circuit. A resistor 22 is connected between a point 23, between the base electrode 11 and the diode 20, and a source of positive biasing potential B+. Another resistor, 24, is connected between a point 25, between the source of negative biasing potential B— and the resistor 15, and a point 26, between the diode 20 and the input terminal 21.

The Zener type diode 16 is of the type that presents a low forward resistance and, in the reverse direction, presents a high resistance throughout a preassigned voltage range, known as the Zener voltage, and then a very low variational resistance for reverse voltages beyond this range. The diode 16 is connected to have a high impedance to current flow from the winding 17 toward the inductor 14. The diode 20 is connected to have a low impedance to current flow from the base electrode 11 toward the resistor 24.

The circuit of FIGURE 1 as hereinbefore described operates in substantially the following manner. Let it be assumed, for example, that under steady state conditions the transistor 10 is operated in its saturated mode. The transistor 10 is driven into its saturation mode by the current flowing from ground, through the emitter and base electrodes 13 and 11, respectively, through the diode 20 and the resistor 24 to the source of negative biasing potential B—. A current also flows from ground, through the emitter and collector electrodes 13 and 12, respectively, through the inductor 14 and the resistor 15 to the source of negative biasing potential B—. At this time, there will not be any substantial current flow from ground through the cores 18 of the memory system, since a voltage greater than the Zener voltage or rating of the diode 16 is required in order to cause the diode 16 to conduct. Since the diode 16 effectively isolates the cores 18 from the driver circuit at this time, the cores 18 may be written into (have information stored therein) by any method known in the art. A restriction is that any induced voltage appearing on the winding 17 should not exceed the Zener voltage of the diode 16.

When an input or positive trigger pulse appears at the input terminal 21, the transistor 10 ceases to conduct. Current flow from the source of positive biasing potential B+ through the resistor 22, the diode 20, and the resistor 24 will drive the base electrode 11 of the transistor 10 slightly positive, cutting off the transistor 10. Accordingly, with the transistor 10 cut off, current flows from ground through the winding 17, the diode 16, the inductor 14, and the resistor 15 to the source of negative biasing potential B−. Since the drive circuit acts as a source of constant current, the rise time of the current through the winding 17 is not substantially affected by the induced counter electromotive force developed by the cores 18 as they are driven from one bistable state to another. Accordingly, the switching time of a core 18 is not substantially reduced. The amplitude of the current pulse for the read-out of the cores 18 is controlled by the magnitude of the source of potential B−, the value of the resistor 15, and the value of the resistance of the inductor 14. The decay of the current pulse is controlled by the pulse width of the trigger signal at the terminal 21 and the value of the inductance of the inductor 14.

FIGURE 2 shows a variation or second embodiment of the driver circuit of the invention shown in FIGURE 1. The principal components of FIGURE 2 are designated by like reference characters to indicate like parts. The apparatus of FIGURE 2 is different from that of FIGURE 1 in that the parallel combination of three transistors **10*a*, 10*b*, and 10*c* is used in place of the single transistor 10, a parallel combination of two resistors 15*a* and 15*b* is used in place of the resistor 15, and a series combination of two diodes 20*a* and 20*b* is used in place of the diode 20. In addition, resistors 26, 27, and 28 are connected between the emitter electrodes 13*a*, 13*b*, and 13*c***, respectively, and the point of reference potential as ground.

The following values for the driver circuit of FIGURE 2 are given to aid in understanding and practicing the invention, it being understood that they should not be construed as limitations, since it is well known in the art that a wide range of component values is possible and that the selection of potentials and parameters of transistors is purely arbitrary. For example, it will be apparent to one skilled in the art that the interchange of PNP and NPN transistors may be readily accomplished.

| | |
|---|---|
| Transistors **10*a***, **14*b***, and **10*c*** | Type 2N396. |
| Inductor **14** | 7 millihenries. |
| Resistors **15*a*** and **15*b*** | 170 ohms. |
| Diode **16** | 1N1589. |
| Diodes **20*a*** and **20*b*** | Type 1N949. |
| Resistor **22** | 1,000 ohms. |
| Resistor **24** | 910 ohms. |
| Resistors **26**, **27**, and **28** | 5.1 ohms. |
| B− | 40 ohms. |
| B+ | 12 volts. |
| Trigger signal at terminal **21** | (−2.6 to −0.3 volts). |

There has been described a driver circuit capable of developing an output pulse required to switch a magnetic core or a number of magnetic cores that make up a memory system. The amplitude and the width of the output pulse are selected to meet the specifications of the cores making up the memory system. The driver circuit of FIGURE 2 was designed to provide a seven-microsecond output pulse and a nominal current of four hundred and forty milliamperes at a temperature of twenty-five degrees centigrade. The driver circuit will operate well at other current amplitudes and pulse widths by modifying the values of the components thereof, and the rise and fall times of the output pulse are not affected substantially of the counter E.M.F. developed by the magnetic cores of the memory system when they are being switched.

While the fundamental novel features of the invention have been shown and described and pointed out as applied to a preferred embodiment, it will be understood that various omissions and substitutions and changes in the form and details of the circuit illustrated and its operation may be made by those skilled in the art without departing from the spirit of the invention. It is the intention, therefore, to be limited only as indicated by the following claims.

What is claimed is:

1. A magnetic core driver comprising
a source of power,
a plurality of saturable magnetic cores capable of assuming bistable states of magnetic remanence,
a common winding coupled to said magnetic cores,
an inductive impedance and a Zener diode connected in series between said source of power and said common winding,
and a switching means connected between said inductive impedance and said Zener diode,
said switching means being adapted to selectively control current flow from said source of power through said common winding or through said switching means.

2. A magnetic core driver comprising
a source of power,
a plurality of saturable magnetic cores capable of assuming bistable states of magnetic remanence,
a common winding coupled to said magnetic cores,
an inductive impedance and a Zener diode connected in series between said source of power and said common winding,
and a semiconductor switching device connected between said inductive impedance and said Zener diode,
said semiconductor switching device being adapted to selectively control current flow from said source of power through said common winding or through said switching means.

3. A magnetic core driver comprising
a source of power,
a plurality of saturable magnetic cores capable of assuming bistable states of magnetic remanence,
a common winding coupled to said magnetic cores,
an inductive impedance and a Zener diode connected in series between said source of power and said common winding,
and a transistor switching device having its collector electrode connected between said inductive impedance and said Zener diode,
said transistor switching device being adapted to selectively control current flow from said source of power through said common winding or through said transistor switching device.

4. A magnetic core driver comprising
a source of power,
a plurality of magnetic cores capable of assuming bistable states of magnetic remanence,
a common winding coupled to said magnetic cores,
an inductive impedance and a Zener diode connected in series between said source of power and said common winding,
a transistor switching device having an emitter electrode, a collector electrode, and a base electrode, said collector electrode being connected between said inductive impedance and said Zener diode, and said emitter electrode being connected to a point of reference potential,
means for causing said transistor switching device to be conductive whereby current flowing from said source of power passes through said transistor switching device and substantially no current passes through said common winding, and means for applying a trigger pulse to said base electrode of said transistor switching device to render it non-conductive whereby current flowing from said source of power passes through said common winding and substantially no current passes through said transistor switching device.

5. A magnetic core driver comprising a source of power, a plurality of magnetic cores capable of assuming bistable states of magnetic remanence, a common winding coupled to said magnetic cores, a resistor, an inductor, and a Zener diode connected in series between said source of power and said common winding, a transistor switching device having an emitter electrode, a collector electrode, and a base electrode, said collector electrode being connected between said inductor and said Zener diode, and said emitter electrode being connected to a point of reference potential, means for causing said transistor switching device to be conductive whereby current flowing from said source of power passes through said transistor switching device and substantially no current passes through said common winding, and means for applying a trigger pulse to said base electrode of said transistor switching device to render it non-conductive whereby current flowing from said source of power passes through said common winding and substantially no current passes through said transistor switching device.

References Cited by the Examiner

UNITED STATES PATENTS

| | | | |
|---|---|---|---|
| 2,914,748 | 11/59 | Anderson | 340—174 X |
| 2,993,198 | 7/61 | Barnes et al. | 340—174 |
| 2,997,600 | 8/61 | Hilberg et al. | 307—88 X |
| 3,008,128 | 11/61 | Powell | 340—174 |
| 3,021,484 | 2/62 | Mestre | 340—174 X |
| 3,025,409 | 3/62 | White | 307—88 |

IRVING L. SRAGOW, *Primary Examiner.*

JOHN F. BURNS, *Examiner.*